United States Patent [19]

Maskovyak et al.

[11] Patent Number: 6,044,410
[45] Date of Patent: Mar. 28, 2000

[54] SYSTEM FOR DATA TRANSFER WHERE MULTI-WORD DATA TRANSMISSION FROM INDUSTRIAL CONTROLLER TO I/O MODULE IS PERFORMED USING I/O IMAGE TABLE-BASED HANDSHAKING PROTOCOL

[75] Inventors: George D. Maskovyak, Parma; John F. Dodds, Newbury, both of Ohio

[73] Assignee: Allen-Bradley Company, LLC, Milwaukee, Wis.

[21] Appl. No.: 09/085,942

[22] Filed: May 28, 1998

[51] Int. Cl.[7] ....................................... G06F 13/10
[52] U.S. Cl. .......................... 710/8; 700/3; 700/7; 710/7; 710/14; 710/32; 710/19; 714/24
[58] Field of Search ................................ 700/3, 7; 710/8, 710/19, 7, 14, 32; 714/24

[56] References Cited

U.S. PATENT DOCUMENTS 3,997,879 12/1976 Markley et al. ........................... 714/24
4,038,533 7/1977 Dummermuth et al. .................. 700/7
4,165,534 8/1979 Dummermuth et al. .................. 700/3
4,228,495 10/1980 Bernhard et al. .......................... 700/7
4,750,150 6/1988 Weppler .................................... 710/8
5,202,964 4/1993 Crouch .................................... 710/19
5,463,735 10/1995 Pascucci et al. ........................ 709/222

Primary Examiner—Thomas C. Lee
Assistant Examiner—Chien Yuan
Attorney, Agent, or Firm—Keith Baxter; John J. Horn; Alex M. Gerasimow

[57] ABSTRACT

A communication protocol employing dummy input and output values is used in communicating blocks of data between an industrial controller and its I/O modules while preventing premature use of partially transmitted data by the I/O modules yet without the need for special handshaking type circuitry or the continuous overhead of such handshaking protocols.

9 Claims, 4 Drawing Sheets

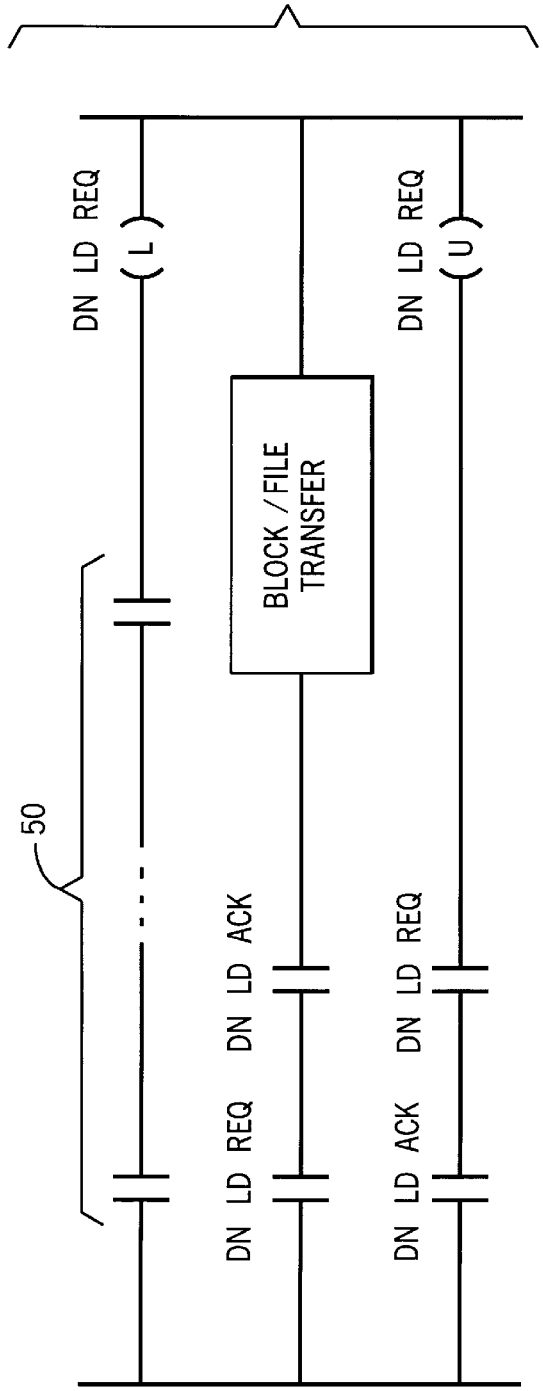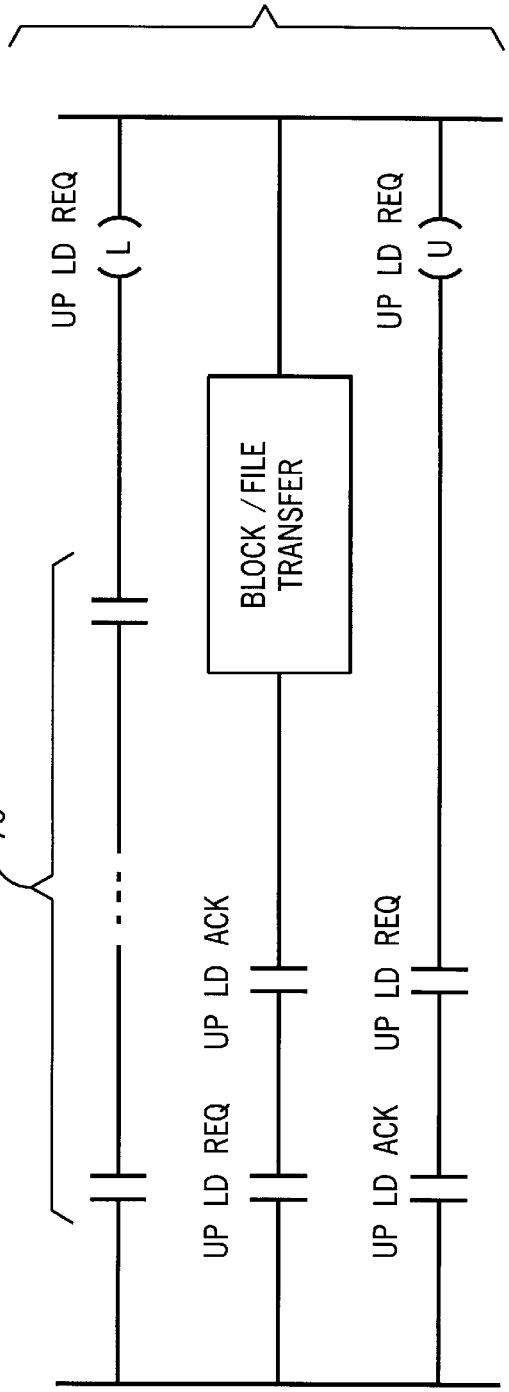

SYSTEM FOR DATA TRANSFER WHERE MULTI-WORD DATA TRANSMISSION FROM INDUSTRIAL CONTROLLER TO I/O MODULE IS PERFORMED USING I/O IMAGE TABLE-BASED HANDSHAKING PROTOCOL

CROSS REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial control systems, and in particular to industrial control systems where blocks of data are transferred between a central processor and one or more independent input/output (I/O) modules.

Industrial controllers are special purpose computers used for controlling industrial processes for manufacturing equipment. Under the direction of a stored program, the industrial controller examines a series of inputs reflecting the status of the controlled process and changes outputs affecting the control of the process. The inputs and outputs are most simply binary, that is "on" or "off", however, analog inputs and outputs, taking on values in a continuous range are also used. The binary inputs and outputs may be represented by single bits of data, the analog inputs and outputs may be represented by multiple bit data words.

In one common architecture for industrial controllers, a central processor executes a control program during which it reads and writes input and output values from and to an I/O image table. The I/O image table is a local memory that collects the values of all inputs and outputs of the control system and which may be rapidly accessed without the complex communication protocols needed to exchange large blocks of data directly with the I/O modules. Normally, separate circuitry, operating asynchronously to the processor refreshes the I/O image table by communicating with one or more I/O modules in a scanning process. Thus, the I/O image table simplifies and speeds the execution of the control program by the processor.

Most advanced industrial processors also include a provision for the block transfer of data which may or may not be I/O data. In a block transfer, the processor may halt further execution of the control program while a multi-word block of data is transferred to or from one or more I/O modules. Generally the block of data is received or transmitted at a time asynchronous to the execution of the internal program of the I/O modules. For this reason, the I/O modules may read from the area of memory receiving the transferred block of data prior to the transfer being complete. Similarly, in the case of data being transmitted from the I/O module, the I/O module may write to the area of memory from which the block of data is being transmitted, changing portions of that data not yet transmitted while failing to change data already transmitted in the block transfer.

Generally this is not a problem when the block of data represents I/O values which change relatively slowly relative to the block transfer rate and whose values have significance independently. The changing or premature use of such block data, however, can be a significant problem when the data represents configuration data such as, for example, the parameters used in a Proportional/Integral/Derivative control loop ("PID") in an I/O module. Such data if read prematurely (i.e., "new data" overwriting "old data" before the old data is utilized) could cause the I/O module to operate unpredictably.

It is known to use handshaking protocols so that two communicating devices can indicate whether a complete transfer of data has occurred. Unfortunately, such handshaking normally requires specialized circuitry supporting a handshaking communication protocol. Such a protocol can be time consuming when applied to all data in a high speed industrial controller intended for use in real-time control. Further, such circuitry is not provided in many controllers.

What is needed is a block transfer method that ensures the data is not used or changed during the transfer and that can be used with existing controllers without hardware modification.

SUMMARY OF THE INVENTION

The present invention provides a method of transferring blocks of data in an industrial controller without the need for specialized handshaking circuitry yet which ensures that the integrity of the data is preserved. The method uses "dummy" I/O image table values to signal completion of the data transfer. For data to be transmitted by the processor to an I/O module, the processor signals a "download request" with a dummy I/O image table value which is sent to the I/O module according to normal operation. Asynchronously, the I/O module responds by setting a "download acknowledge" dummy I/O image table value which, when asynchronously read by the processor, initiates the transfer. At the conclusion of the transfer the "download request", value is reset which when read by the I/O module indicates that the transfer is complete.

In this way separate handshaking circuitry and specialized bit sequences for handshaking signals are not required.

Specifically the method includes a writing by the processor to the I/O image table of a predetermined data request value under the control of a user written control program and the asynchronous transmission of the predetermined data request value to the I/O module. The I/O module responds to the predetermined data request value by writing to local I/O memory a predetermined data acknowledgment value and asynchronously transmitting the predetermined data acknowledgment value to the I/O image table of the processor. The processor further responds to the predetermined data acknowledgment value by performing a multi-word transmission under the control of the control program to the I/O module and then resets the predetermined data request value which is asynchronously transmitted to the I/O module. The I/O module responds to the resetting of the data request value by resetting the data acknowledgment value in local I/O memory.

Thus, it is one object of the invention to provide integrity in the transmission of multi-word data in an industrial controller without handshaking circuitry and without changing the controller hardware or the processor firmware. The steps performed by the processor may be realized completely in the control program normally written by the end user of the industrial controller. Only small changes in the firmware of the I/O module are required.

It is another object of the invention to add the overhead of handshaking only when needed and not during normal high speed operation of the controller. By implementing the handshaking in the control program itself, it need only be invoked when necessary.

It is yet another object of the invention to provide the necessary signals for handshaking through the use of dummy I/O values which are user accessible. By using I/O values in the I/O image table, special firmware and hardware protocols can be avoided.

The foregoing and other objects and advantages of the invention will appear from the following description. In this description, references are made to the accompanying drawings which form a part hereof, and in which there is shown by way of illustration the preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 3 is a fragment of a user program written in relay ladder logic as would be written by the user of the industrial controller of FIG. 1 to provide for a block transfer from the processor of FIG. 2 to the I/O module of FIG. 2 per the present invention;

FIG. 4 is a figure similar to that of FIG. 3 showing a user program written to transfer a block of data from the I/O module of FIG. 2 to the processor module of FIG. 2 per the present invention;

DETAILED DESCRIPTION OF THE PREFERRED EMBODIMENT

Figure 1:
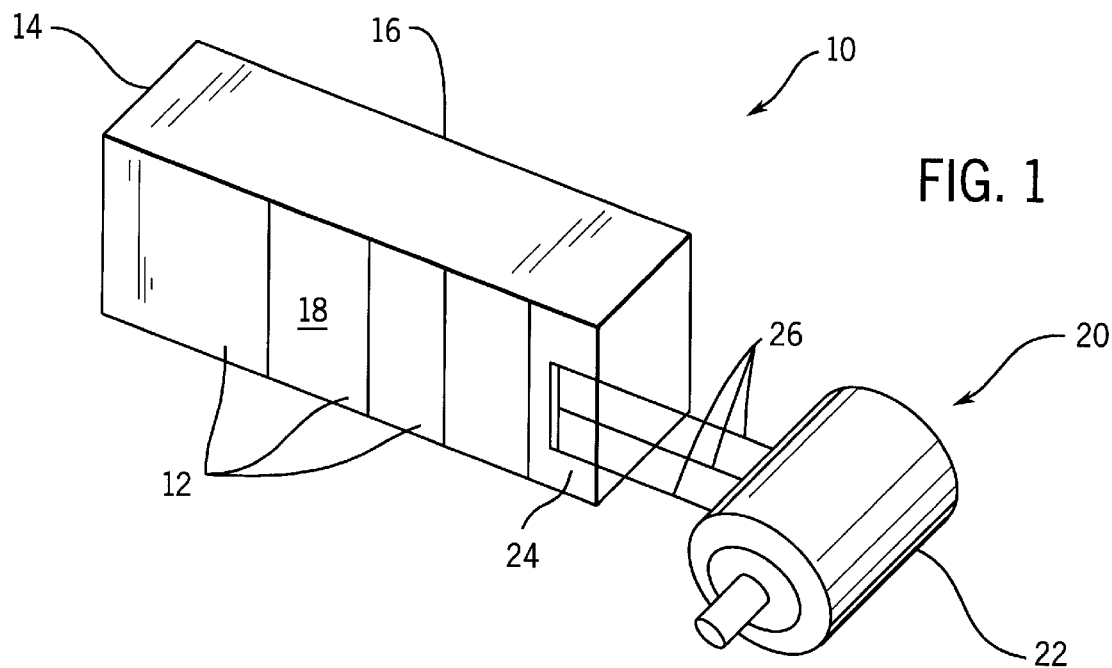
FIG. 1 is perspective view of an industrial controller in which various modules including a processor module and at least one I/O module are interconnected in a rack having a common back plane, and showing one I/O module connected to a motor for PID type feedback control.

Referring now to FIG. 1, an industrial control system 10 includes a set of independent modules 12 received by a rack 14 and interconnected by a common backplane 16 according to methods well known in the art. One module 12 is a processor module 18 executing a control program to control an industrial process 20 indicated for clarity as a single motor 22, via an I/O module 24. The I/O module 24 receives electrical inputs from the process 20 and providing electrical outputs to the process 20 via I/O lines 26. The rack 14 may include a power supply and other modules as are well known in the art. Such industrial controllers 10 are available commercially from the Rockwell Automation Division of Rockwell under the trade name 1746SLC Industrial Controller.

Figure 2:
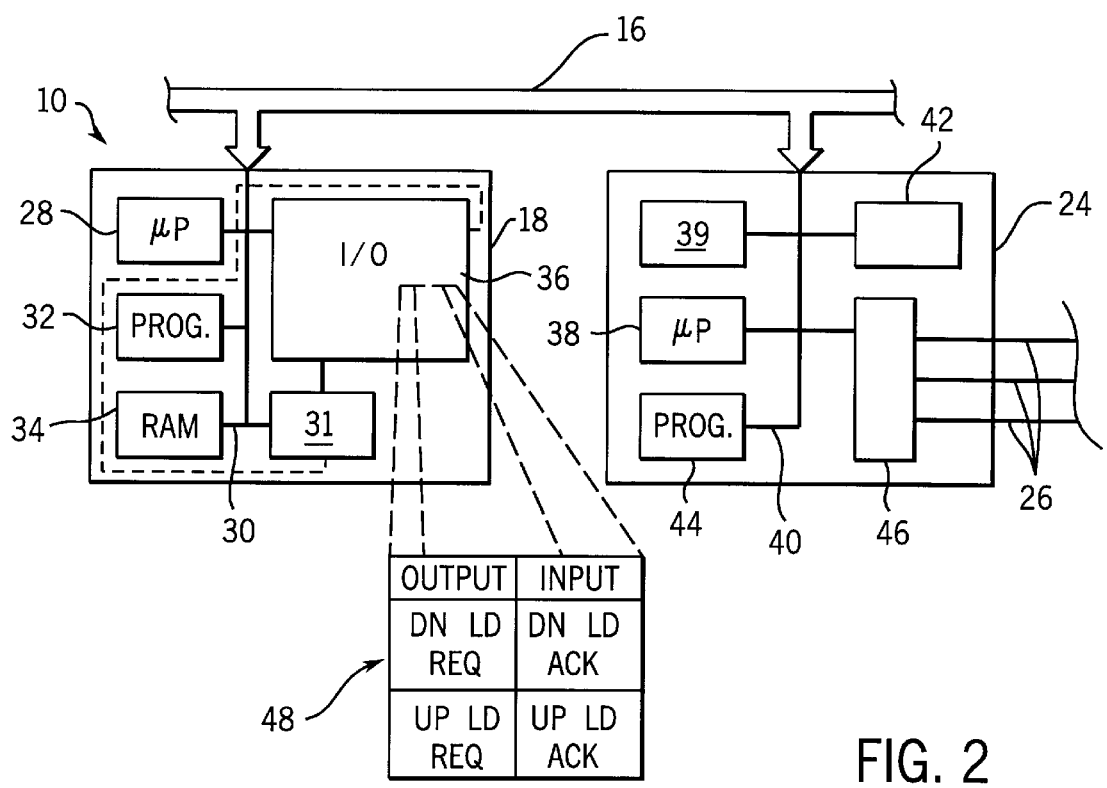
FIG. 2 is a block diagram of the elements of the processor and I/O module of FIG. 1 showing an I/O image table used by the processor and a portion of that I/O image table used by the present invention and further showing other memory space allocated for a user program.

Referring now to FIG. 2, the processor module 18 includes a microprocessor 28 communicating on an internal bus 30 with the backplane 16 via communication circuitry (not shown) and with memory including a program memory holding a user written program 32 typically written in relay logic language, a general purpose memory 34 and a I/O image table 36. As is known in the art, the I/O image table 36 provides a mapping of all input and output to the industrial controller 10 from and to its various I/O modules 24 for use by the microprocessor 28 in executing the user written program 32. The I/O image table 36 is updated asynchronously and "invisibly" to the microprocessor 28 by scanning circuitry 31.

The I/O module 24 includes a microprocessor 38 communicating on an internal data bus 40 with the backplane 16 via interface circuitry (not shown) and with memories including a general purpose memory 42 holding input and output values unique to the I/O module 24 and a program memory holding the internal program 44 of the I/O module 24 in "firmware". This latter memory is typically nonvolatile read-only memory and is programmed at the factory.

The I/O lines 26 from the controlled process 20 are received by I/O interface circuitry 46 in the I/O module as is well known in the art, and communicated along the bus 40 for storage in the general purpose memory 42 and/or processing by the microprocessor 38. Scanning circuitry 39 operating in response to the operation of the scanning circuitry 31 in the processor module 18, exchanges data between the general purpose memory 42 to the I/O image table 36 of the processor module 18 asynchronously to the operation of the I/O module 24 microprocessor 38 to update the I/O image table 36 with input data or download output data to the general purpose memory 42.

Referring still to FIG. 2, normally the I/O image table 36 holds data reflecting the actual state of the controlled process 20 as may be reflected in electrical signals on I/O lines 26. In the present invention, however, four dummy I/O values 48 are reserved within the I/O image table 36 for use in transferring data between the processor module 18 and the I/O module 24. These values are termed "dummy" values because they do not correspond to any actual I/O value. Nevertheless, these dummy I/O values 48 may be manipulated by the user written program 32 like any other I/O value and are automatically asynchronously transferred along the backplane 16 between the I/O image table 36 and the general purpose memory 42 of the various I/O modules. Similarly, the microprocessor 38 of the I/O module 24 may read and manipulate these dummy I/O values 48 as if they were actual I/O values.

The I/O image table 36 is generally divided into input values received from the I/O modules 24 indicating electrical signals received from the controlled process 20 and output values transmitted to the I/O modules 24 to provide electrical signals to the control process 20. In the present invention, two dummy I/O values 48 are provided in the output portion of the I/O image table 36 abbreviated as DN LD REQ (meaning "down load request") and UP LD REQ (meaning "up load request"). In addition, two input dummy I/O values 48 are used in the present invention DN LD ACK (meaning "down load acknowledge") and UP LD ACK (meaning "up load acknowledge").

Figure 5:
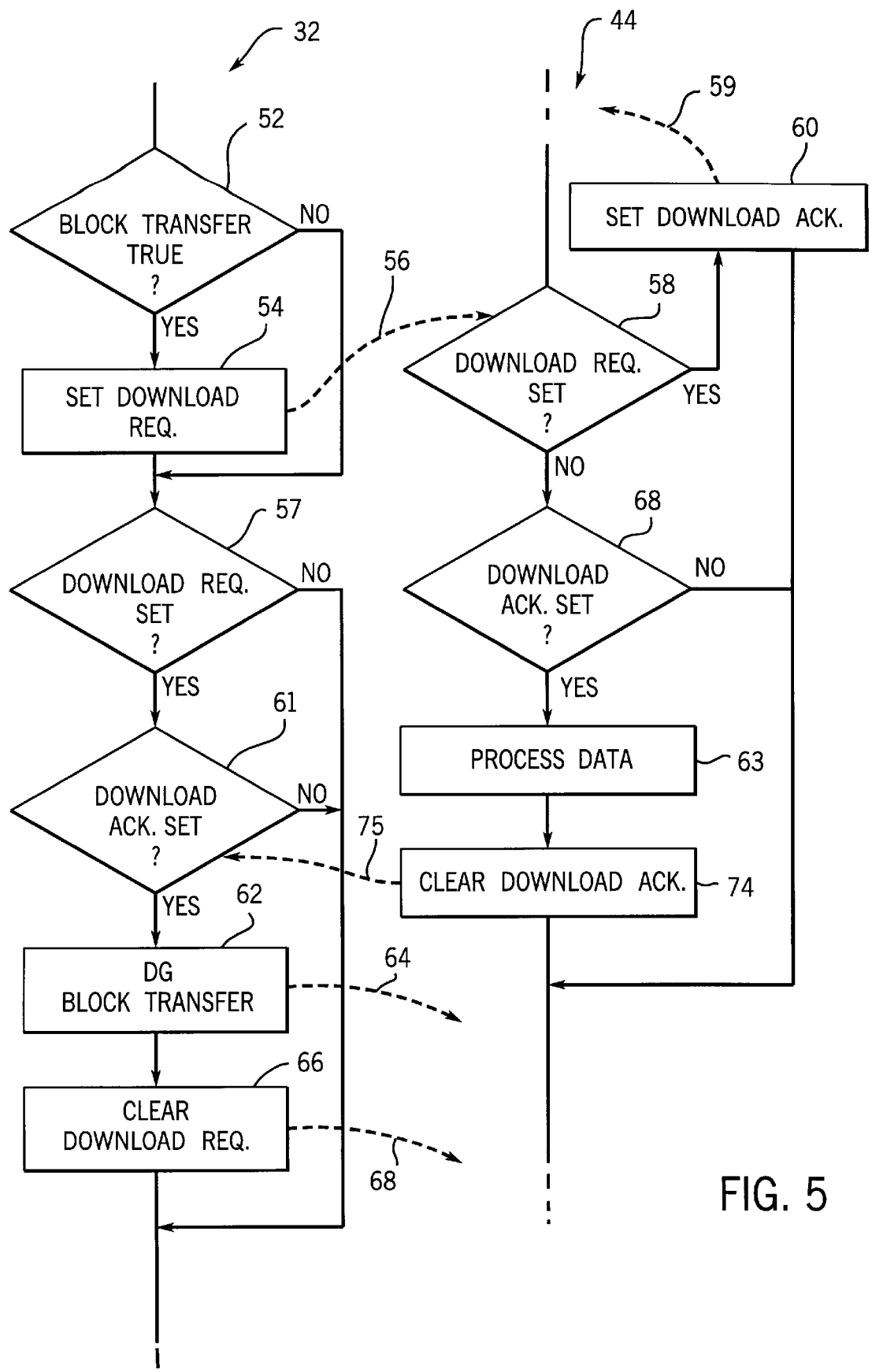
FIG. 5 is a of flowcharts showing programs concurrently executed in the processor module in the I/O module of FIG. 2 using the programs of FIG. 3 to download data per the present invention.

Referring now to FIGS. 2, 3 and 5, a portion of the present invention is implemented by the user written program 32 executed by the processor 18 and a portion of the present invention is implemented by the firmware program 44 running in the I/O module 22.

Figure 6:
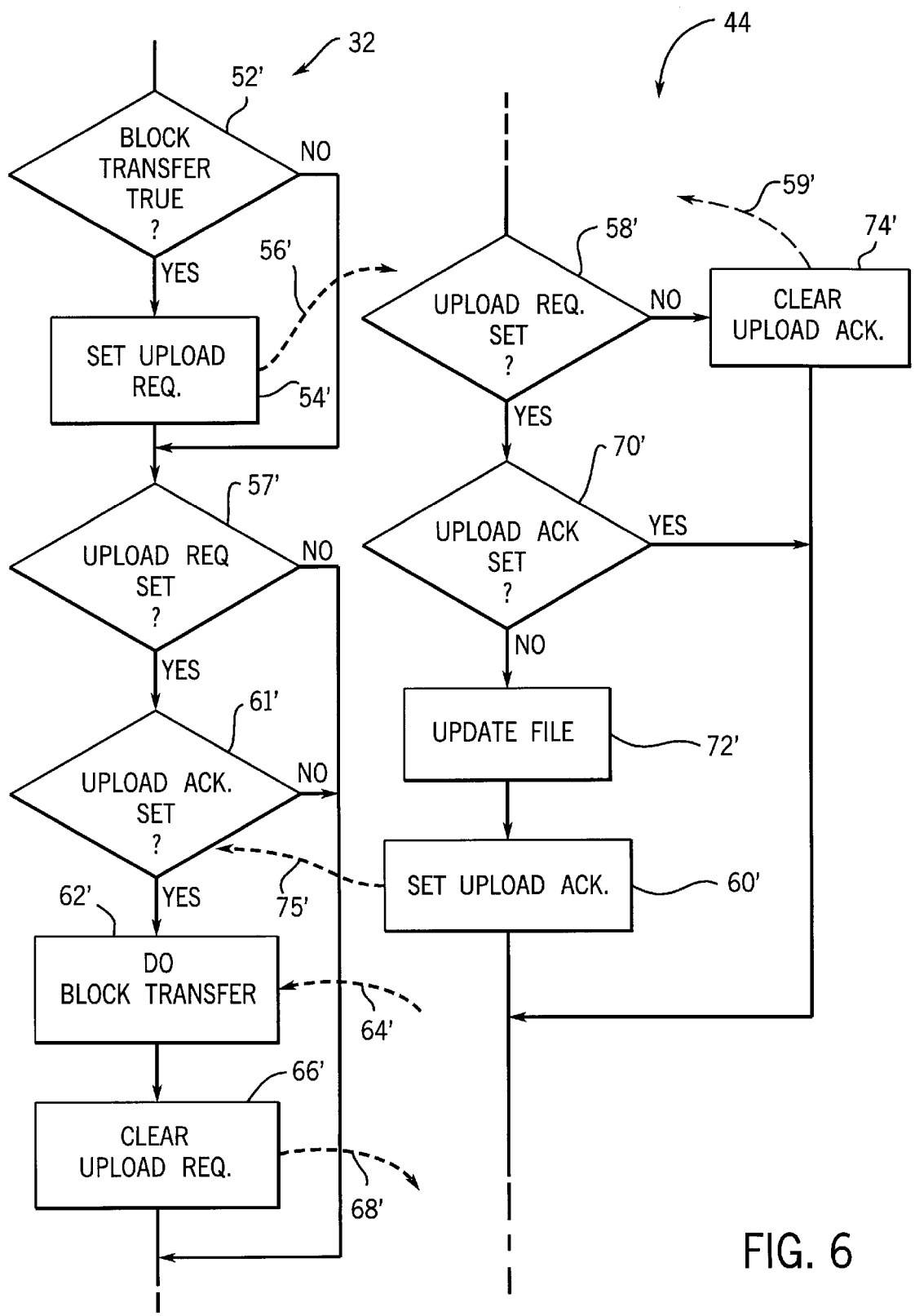
FIG. 6 is a of flowcharts showing programs concurrently executed in the processor module in the I/O module of FIG. 2 using the programs of FIG. 4 to upload data per the present invention.

When it is desired to download a block of data from the processor 18 to the I/O module 24, the dummy values of DN LD REQ and DN LD ACK are used. Alternatively, when it is desired to up load a block of data from the processor 18 to the I/O module 24, the dummy values of UP LD REQ and UP LD ACK are used. FIGS. 3 and 5 are applicable to uploading and FIGS. 4 and 6 are applicable to downloading.

Considering first a downloading, in a first step of a portion of the user written program 32 used for this purpose, shown in FIG. 3, a predicate condition 50 to the block/file transfer must be true (as indicated by process block 52 of FIG. 5). This predicate condition is determined by the user according to the purpose for which the data will be downloaded but may be, for example, an indication that initialization of the I/O modules 24 is required, such as providing to I/O module 24 its operating parameters of PID gains in a conventional PID control loop. The predicate condition 50 will consist of one or more contacts in a relay ladder rung. The determination of the satisfaction of the predicate condition 50 is indicated by decision block 52.

When the predicate condition 50 is true, the DN LD REQ value of the dummy I/O values 48 is set as indicated by the latching relay symbol in the first line of the relay ladder code of FIG. 3 and process block 54 in FIG. 5. This setting operation changes the value of the DN LD REQ output value in the I/O image table 36 whose contents are asynchronously transmitted 56 over the backplane from the I/O image table 36 to general purpose memory 42 of the I/O module 24.

Sometime later, as determined by the normal execution of program 44 by microprocessor 38 in I/O module 24, the setting of the DN LD REQ bit it detected is indicated by decision block 58 of FIG. 5. The following decision block 57 detects the setting of the DN LD REQ bit and causes the program 32 to branch around remaining blocks 61, 62, and 66 as will be described only if the DN LD REQ bit is not set.

If the DN LD REQ output value is detected at decision block 58, the program 44 of the I/O module 24 proceeds to process block 60 and in the general purpose memory 42 the DN LD ACK input value is set. The program 44 also causes and data in the general purpose memory 42 susceptible to the block/file transfer to be locked, meaning that it is neither used by other parts of the program 44 as indicated by the branching around process block 63 to be described below.

Data that may be subject to the block/file transfer of the present invention is in a defined memory location of general purpose memory 42 to be recognized by the program 44 and typically unique to the I/O module 24. For example, a special area of general purpose memory 42 for the operating parameters of the PID loop may be designated at the time of manufacture of the I/O module 24 and the address range of this area programmed into program 44.

The setting of the DN LD ACK input value is asynchronously transmitted 59 to the I/O image table 36 with all other input data as part of the scanning process where it is detected by the processor module 18 as indicated by decision block 61 immediately following decision block 57.

Referring to FIG. 3, this detection is better understood at the second rung of the ladder logic program of FIG. 3 where the first contact is closed as a result of the setting of the DN LD REQ output value but the entire rung is not true until the setting of the DN LD ACK input value. The program proceeds to the third rung until the DN LD ACK input value is set.

Once the DN LD ACK input value is set, both contacts in series on the second rung of FIG. 3 are closed and the block/file transfer routine executes as indicated by process block 62, following process block 61 in FIG. 5. This block/file transfer routine is preprogrammed into most commercial industrial controllers. During the execution of the block/file transfer, further scanning of the rungs of FIG. 3 ceases.

Upon completion of the block/file transfer, the program 32 resumes execution at the third rung of FIG. 3. Here because the DN LD ACK input value and DN LD REQ output value are set, the rung executes and the DN LD REQ output value is reset as indicated by process block 66 of FIG. 5.

This reset value is transmitted 68 to the I/O image table 36 to general purpose memory 42 of the I/O module 24 where it is detected by decision block 58 causing the program to advance to decision block 68 where the value of DN LD ACK is checked. If DN LD ACK is set, the I/O module 24 effectively unlocks the data in general purpose memory 42 as indicated by process block 63 which permits processing of the affected data normally. Sometime later at process block 74, the I/O module resets the DN LD ACK input value thus completing the transfer process. This value is transmitted 75 to be detected at process block 61 of program 32.

As can be seen, the communication 56, 59, 64, 68 and 75 need not be synchronized to the operation of the I/O module 24 yet ensures that the I/O module 24 does not prematurely use or change the data being transferred.

Referring now to FIG. 4, the same procedure may be used for a processor 18 initiated uploading of data with the use of the UP LD REQ output value and UP LD ACK input value instead of the DN LD REQ output value and DN LD ACK input value. The program 32 at the processor is exactly analogous with blocks 52', 54', 57', 61', 62', and 66' corresponding to blocks 52, 54, 57, 61, 62, and 66 previously described. In the program 44 blocks 58', 60' 70', 72', and 74' are analogous to blocks 58, 60 70, 72, and 74 with the following exceptions: at process block 74' UP LD REQ is reset and at process block 60' UP LD ACK is set and at decision block 58' a branch is made to process block 74' only if UP LD REW is set and otherwise the program 44 proceeds to decision block 70'.

The block/file transfer predicate condition 76 shown in FIG. 4 as contact 76 triggers a setting of the UP LD REQ output value when an acknowledgment through the UP LD ACK input value is received. Then at the second rung of FIG. 4, the block/file transfer (this time from the I/O module 24 to the processor 18) is initiated. Upon completion of that transfer, with the UP LD ACK and UP LD REQ values set, the UP LD REQ output value may be reset as indicated by the third rung of FIG. 4.

The above description has been that of a preferred embodiment of the present invention. It will occur to those who practice the art that many modifications may be made without departing from the spirit and scope of the invention. In order to apprise the public of the various embodiments that may fall within the scope of the invention the following claims are made.

We claim:

1. In an industrial controller having a processor executing a control program to read and write data values representing a state of a controlled process from and to an I/O image table, the data values in the I/O image table asynchronously exchanged with local memory of I/O modules, the I/O modules communicating directly with the controlled process, a method of preserving the integrity of a multi-word data transmission between the I/O modules and the processor comprising the steps of:

(a) writing by the processor to the I/O image table a predetermined data request value;

(b) asynchronously transmitting the predetermined data request value to the I/O module;

(c) responding by the I/O module to the predetermined data request value by writing by the I/O module to local memory a predetermined data acknowledgment value;

(d) asynchronously transmitting the predetermined data acknowledgment value to the I/O image table of the processor;

(e) responding by the processor to the predetermined data acknowledgment value by performing the multi-word data transmission;

(f) resetting by the processor of the predetermined data request value;

(g) asynchronously transmitting the reset data request value to the I/O module; and (h) responding by the I/O module to the resetting of the data request value by the I/O module resetting the data acknowledgment value in local memory.

2. The method of claim 1 wherein the multi-word data transmission is from the I/O module to the processor.

3. The method of claim 2 including the step of the I/O module locking the data of the multi-word data transmission from changing after the I/O module writes to local memory the predetermined data acknowledgment value and before the I/O module asynchronously receives the reset data request value.

4. The method of claim 1 wherein the multi-word data transmission is from the processor to the I/O module.

5. The method of claim 4 including the step of the I/O module locking the data of the multi-word data transmission from use after the I/O module writes to local memory the predetermined data acknowledgment value and before the I/O module asynchronously receives the reset data request value.

6. The method of claim 1 wherein the multi-word data is used by the I/O module to set parameters of a control loop between the I/O module and the controlled process.

7. An industrial controller comprising:
 (a) a processor executing a control program to:
  (i) read and write data values representing a state of a controlled process from and to an I/O image table;
  (ii) asynchronously exchange the data values in the I/O image table with local memory of I/O modules;
  (iii) initiate a multi-word data transfer between the I/O module and the processor by writing to the I/O image table a predetermined data request value;
  (iv) responding to a predetermined data acknowledgment value from the I/O module by performing the multi-word data transmission; and
  (v) resetting the predetermined data request value;
 (b) I/O modules executing a control program to:
  (i) communicating directly with the controlled process based on value in the local memory;
  (ii) responding to the predetermined data request value by writing a predetermined data acknowledgment value to local memory; and
  (iii) responding to the resetting of the data request value by resetting the data acknowledgment value in local memory.

8. The industrial controller of claim 7 wherein the multi-word data transmission is from the I/O module to the processor and wherein the I/O module is further programmed to lock the data of the multi-word data transmission from changing after the I/O module writes to local memory the predetermined data acknowledgment value and before the I/O module asynchronously receives the reset data request value.

9. The industrial controller of claim 7 wherein the multi-word data transmission is from the processor to the I/O module and wherein the I/O module is programmed to lock the data of the multi-word data transmission from use by the I/O module after the I/O module writes to local memory the predetermined data acknowledgment value and before the I/O module asynchronously receives the reset data request value.

* * * * *